(12) United States Patent
Barth

(10) Patent No.: US 8,511,545 B1
(45) Date of Patent: *Aug. 20, 2013

(54) METHOD AND SYSTEM FOR PRE-FILLING ACCOUNT INFORMATION

(75) Inventor: Ryan R. Barth, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/488,853

(22) Filed: Jun. 5, 2012

Related U.S. Application Data

(63) Continuation of application No. 13/027,914, filed on Feb. 15, 2011, now Pat. No. 8,191,769, which is a continuation of application No. 11/735,432, filed on Apr. 13, 2007, now Pat. No. 7,886,963.

(51) Int. Cl.
G07F 19/00 (2006.01)

(52) U.S. Cl.
USPC ............................................. 235/379; 705/38

(58) Field of Classification Search
USPC ...................... 235/379; 705/38, 40
See application file for complete search history.

(56) References Cited

U.S. PATENT DOCUMENTS

| | | | |
|---|---|---|---|
| 7,886,963 B1 * | 2/2011 | Barth | ........................... 235/379 |
| 2003/0225688 A1 | 12/2003 | Dobbins | |
| 2005/0021456 A1 | 1/2005 | Steele et al. | |
| 2006/0116949 A1 | 6/2006 | Wehunt et al. | |
| 2007/0067238 A1 | 3/2007 | Rabson et al. | |

OTHER PUBLICATIONS

Intelliswitch, The Private Bank of the Peninsula, [online], [retrieved from the internet on May 24, 2007 using <URL: http://solutions.secure-banking.com/switch/index.asp?id=81091>, 2 pgs.

Online Account Application, Chase, [online], [retrieved from the internet on May 24, 2007 using <URL: https://chaseonline.chase.com/chaseonline/signup/oao/begin.do?PROD_CODE=010&SUB_PROD_CODE=110&PROD_SEG=AFFLUENT >, 2 pgs.

Unified Account Opening, Infosys, [online], [retrieved from the internet on May 24, 2007 using <URL: http://www.infosys.com/brochure/unified-account-opening.pdf>, 2 pgs.

* cited by examiner

*Primary Examiner* — Karl D Frech
(74) *Attorney, Agent, or Firm* — Brooks, Cameron & Huebsch, PLLC

(57) ABSTRACT

Method and system are disclosed for automatically filling in external account information on a new account application. The method and system capture account-identifying information for an external account from electronic transactions involving the external account. The captured external account information may be used to automatically pre-fill new account information fields that require information about the external account. Account-identifying information for internal accounts may also be used to automatically pre-fill the new account application. Such an arrangement greatly simplifies the process of filling out new account applications.

20 Claims, 6 Drawing Sheets

FIG. 3A

```
 ┌──────┬─────────┬──────────┬─────┐         302              Help    300
 │ Home │ Banking │Investment│ ... │        
 ├──────┴┬────────┼──────────┴┬────┤
 │Checking│ Savings│Credit Card│ ...│
 └────────┴────────┴───────────┴────┘

Checking Account Application
 ─────────────────────────────────────────────────

○ Account Type   ● Personal Info   ○ Features   ○ Deposit   ...   304a
                 Name: │Jane Mary Doe              ▼│  304b
                       │John William Doe            │
              Address: │                            │  304c
        City, State, Zip: │                         │  304d
       Telephone Number:  │                         │
                                    . . .
```

FIG. 3B

```
 ┌──────┬─────────┬──────────┬─────┐         302              Help    300
 │ Home │ Banking │Investment│ ... │
 ├──────┴┬────────┼──────────┴┬────┤
 │Checking│ Savings│Credit Card│ ...│
 └────────┴────────┴───────────┴────┘

Checking Account Application
 ─────────────────────────────────────────────────

○ Account Type   ● Personal Info   ○ Features   ○ Deposit   ...   304a
                 Name: │John William Doe            │  304b
              Address: │123 Main Street             │  304c
        City, State, Zip: │Any Town, California 12345│ 304d
       Telephone Number: │571-272-8850              │
                                    . . .
```

METHOD AND SYSTEM FOR PRE-FILLING ACCOUNT INFORMATION

CROSS-REFERENCE TO RELATED APPLICATIONS

This application is a continuation of U.S. patent application Ser. No. 13/027,914, filed Feb. 15, 2011, now U.S. Pat. No. 8,191,769, which is a continuation of U.S. patent application Ser. No. 11/735,432, filed on Apr. 13, 2007, now U.S. patent Ser. No. 11/735,432. This application is also related in subject matter to, and incorporates herein by reference in their entirety, co-pending U.S. patent application entitled "Method and System for Pre-filling Account Information," filed Apr. 13, 2007 Ser. No. 11/735,431, and five U.S. patent applications, each entitled "Methods and Systems for Electronic Transfer of Financial Accounts Between Financial Institutions,"each filed on Oct. 10, 2006, and each receiving one of Ser. Nos. 11/548,004, 11/548,018, 11/548,029, 11/548,049 and 11/548,073, respectively.

COPYRIGHT NOTICE

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

TECHNICAL FIELD

The disclosed embodiments relate generally to accumulation and use of account information. More specifically, the disclosed embodiments relate to systems and methods for automatically pre-filling fields that require such account information

BACKGROUND

People often have accounts and memberships with multiple institutions in connection with their personal and professional activities. For example, a person may have financial accounts (e.g., credit card, checking, savings, investment, etc.), rental accounts (e.g., movie, automobile, furniture, etc.), service accounts (e.g., airline, hotel, restaurant, etc.), and the like. The person may choose the institutions for any number of reasons, including convenience, cost, quality of product/service, reward programs, and the like.

When an individual wishes to open a new account or switch an existing account from one institution to another, the process involved is often complicated. For example, when a new account is opened with a financial institution (e.g., bank) or when an account is switched from one financial institution to another, the individual typically must provide several items of information pertaining to previously-opened financial accounts. This information is often not readily available and may even be difficult to obtain, sometimes requiring that the individual contact the previous financial institutions.

Accordingly, it would be desirable to be able to provide a way to eliminate or decrease some of the complications involved in opening a new account or switching an existing account from one institution to another. More specifically, it would be desirable to be able to provide a way to automatically present the individual with some or all of the information needed to open a new account or switch his/her existing account.

SUMMARY

This summary is not intended to represent each embodiment or every aspect; the following paragraphs of this summary provide representations of some embodiments as aspects thereof.

The disclosed embodiments are directed to methods and systems for automatically filling in external account information on a new account application. The method and system capture account-identifying information for an external account from electronic transactions involving the external account. The captured external account information may be used to automatically pre-fill new account information fields that require information about the external account. Account-identifying information for internal accounts may also be used to automatically pre-fill the new account application. Such an arrangement greatly simplifies the process of filling out new account applications.

In general, in one aspect, the disclosed embodiments are directed to a system for automatic pre-fill of external account information. The system comprises at least one subsystem configured to capture account-identifying information for an external account from an electronic transaction between a first institution and a second institution, the external account being managed by the second institution. The system further comprises at least one subsystem configured to pre-fill one or more account information fields for the first institution using the captured account-identifying information for the external account.

In general, in another aspect, the disclosed embodiments are directed to a method of automatic pre-fill of external account information. The method comprises capturing account-identifying information for an external account from an electronic transaction between a first institution and a second institution, the external account being managed by the second institution, and pre-filling one or more account information fields for the first institution using the captured account-identifying information for the external account.

In general, in yet another aspect, the disclosed embodiments are directed to a computer-readable medium encoded with computer readable instructions for causing a computer to automatically pre-fill external account information. The computer-readable instructions comprising instructions for causing the computer to capture account-identifying information for an external account from an electronic transaction between a first institution and a second institution, the external account being managed by the second institution, and pre-fill one or more account information fields for the first institution using the captured account-identifying information for the external account.

BRIEF DESCRIPTION OF THE DRAWINGS

The foregoing and other advantages of the invention will become apparent from the following detailed description and upon reference to the drawings, wherein:

FIGS. 3A-3B illustrate an exemplary interface for pre-filling personal information according to the disclosed embodiments;

DETAILED DESCRIPTION

Methods and systems will now be described more fully with reference to the accompanying drawings in which various embodiment(s) are shown. The methods and systems may, however, be embodied in many different forms and should not be construed as limited to the particular embodiments set forth herein. For example, although the methods and systems described relate specifically to the financial services industry (e.g., credit card, banking, investment, etc.), those having ordinary skill in the art will recognize that the concepts and principles taught herein may be implemented for any industry where an individual's account and personal information are exchanged electronically between institutions (e.g., medical institutions, educational institutions, hospitality and entertainment institutions, etc.).

Figure 1:
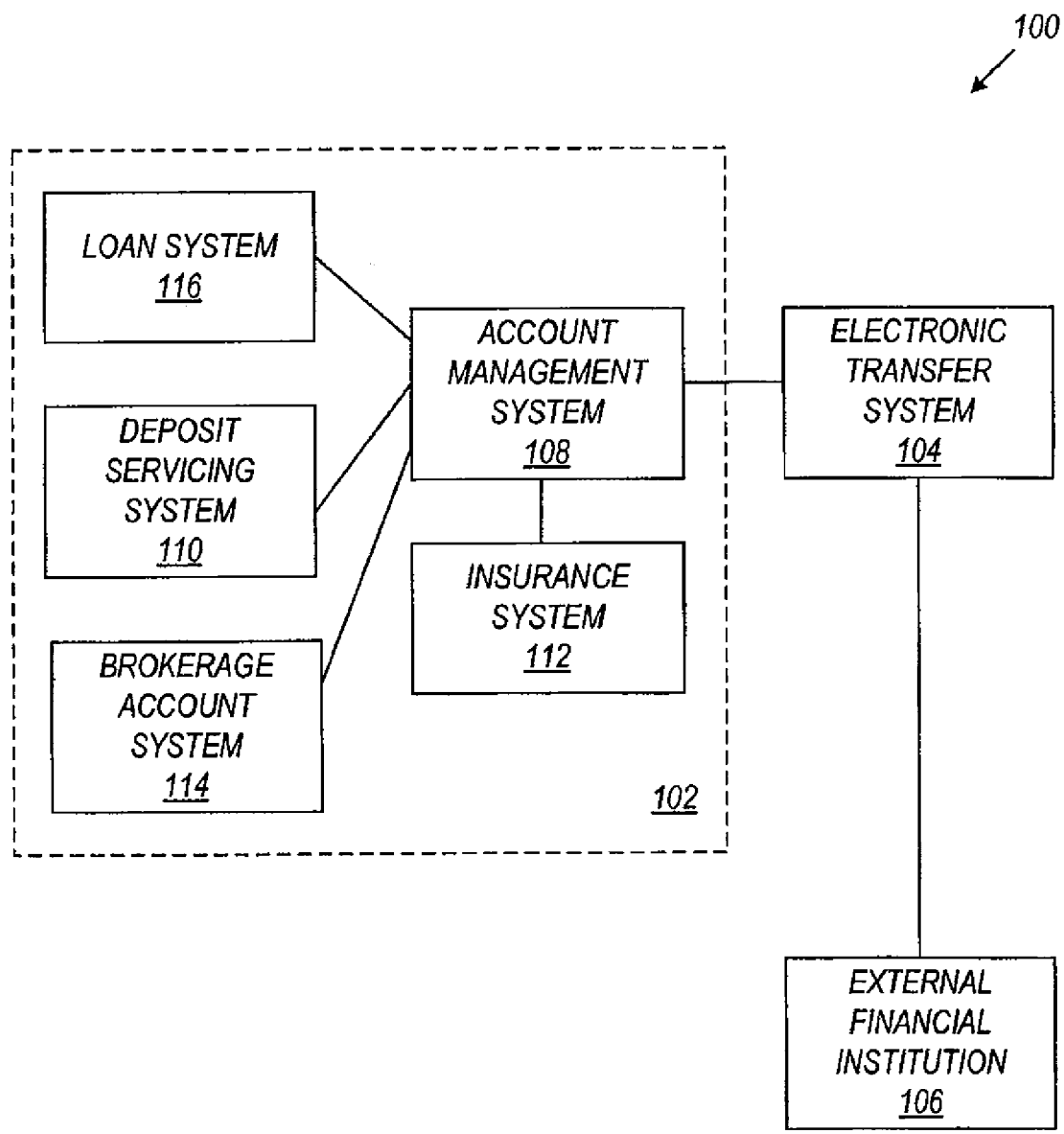
FIG. 1 illustrates an example of a network for conducting financial transactions according to the disclosed embodiments.

FIG. 1 is a block diagram of a network 100 for conducting electronic transactions according to the disclosed embodiments. As noted above, although the network 100 relates specifically to the financial services industry, similar networks may certainly be implemented for other industries by those having ordinary skill in the art. In the example shown here, the network 100 includes a financial institution 102 interoperably connected to an electronic transfer system 104. The electronic transfer system 104 is interoperably connected to an external financial institution 106 (i.e., a third-party financial institution). Such an electronic transfer system 104 may be, for example, a system such as PEP® (Paperless Entry Processing) from CheckFree Corp. of Atlanta, Ga. that enables the origination and receipt of electronic payments through an automated clearing house (ACH).

In a typical embodiment, each of the financial institution 102, the electronic transfer system 104, and the external institution 106 includes one or more servers interoperably connected via a local area network, a wide area network, the Internet, or another telecommunications infrastructure allowing data communication. The financial institution 102 includes an account management system 108 interoperably connected to a deposit servicing system 110, an insurance system 112, a brokerage account system 114, and a loan system 116. In a typical embodiment, the financial institution 102 includes the account management system 108, the deposit servicing system 110, and one or more of the systems 112-116. Those having skill in the art will appreciate that the systems 112-116 are exemplary and that more or fewer financial systems may be included within the financial system 102.

The account management system 108 operates, inter alia, to capture money movement involving any external account (i.e., an account managed by independent third party institution) with which any of the systems 110-116 of the financial system 102 interact. Thus, inbound and outbound funds transfers between any of the systems 110-116 and an account of the external financial institution 106 or other external financial institutions pass through the account management system 108 and information related to money movement pertaining to those transactions is captured by the account management system 108. For example, information regarding payments made by a customer of the financial institution 102 for premiums on insurance policies administered using the insurance system 112 originating from the external financial institution 106 are captured by the account management system 108. In similar fashion, information regarding transfers of funds either to or from the deposit servicing system 110, the brokerage account system 114, or the loan system 116 are also captured by the account management system 108.

In a common scenario, the loan system 116 is used to administer loans made to the customer of the financial institution 102, such as, for example, home mortgages, auto loans, and the like. The brokerage account system 114 may be used by the customer of the financial institution 102 to administer investment or other brokerage accounts of the customer of the financial institution 102. The insurance system 112 may be used to administer property and casualty insurance, life insurance, or other types of insurance. The deposit servicing system 110 is used to administer customer accounts of the financial institution 102, such as, for example, checking and savings accounts.

In one example, the customer of the financial institution 102 may fund his/her investments administered using the brokerage account system 114 from his/her account at the external financial institution 106. In such an example, funds originating at the external financial institution 106 would result in information relative to the account at the external financial institution (from which payments are made into the brokerage account system 114) being captured by the account management system 108. In similar fashion, when funds are received by a customer account administered using the deposit servicing system 110 from the external financial institution 106 or another external financial institution (or when funds are sent to the external financial institution 106 or another external financial institution from the customer account administered using the deposit servicing system 110), information regarding the external account to (or from) which funds are exchanged is captured by the account management system 108. When funds are transferred into or out of either of the insurance system 112 or the loan system 116, and they originate or terminate in the external financial institution 106 or another financial institution, the account management system 108 captures information in similar fashion to that discussed above.

When funds are exchanged between an account of the external financial institution 106 and any of the systems 110-116 and the account of the external financial institution is a checking or savings account, the account management system 108 captures at least a routing number of the external financial system 106 and an account number of the account of the external financial institution 106. When a credit-card or debit-card account is the account at the external financial institution 106, the account management system 108 typically captures at least the credit card number, the security (i.e., CV2) code of the card, and the expiration date of the card. Those having skill in the art will appreciate that the security code is a cryptographic value printed on a card signature strip for authentication of the card during so-called Card Not Present transactions.

In operation, when a funds transfer occurs, the account management system 108 detects the funds transfer passing through the account management system 108, which may be either from one of the systems 110-116 of the financial institution 102 through the electronic transfer system 104 to the external financial institution 106 (or another external financial institution), or it may be from the external financial institution 106 (or another external financial institution) through the electronic transfer system 104 to one of the systems 110-116 of the financial institution 102. When such a funds transfer is detected, the account management system 108 captures any external account information being exchanged for the customer, processes the information, and stores the external account information from the account of the external financial institution 106 from or to which funds are being transferred. Such account information, along with personal information for the customer (already captured and stored by virtue of the customer having one or more accounts with the financial institution 102), may then be reused to conduct future transactions as needed.

Figure 2:
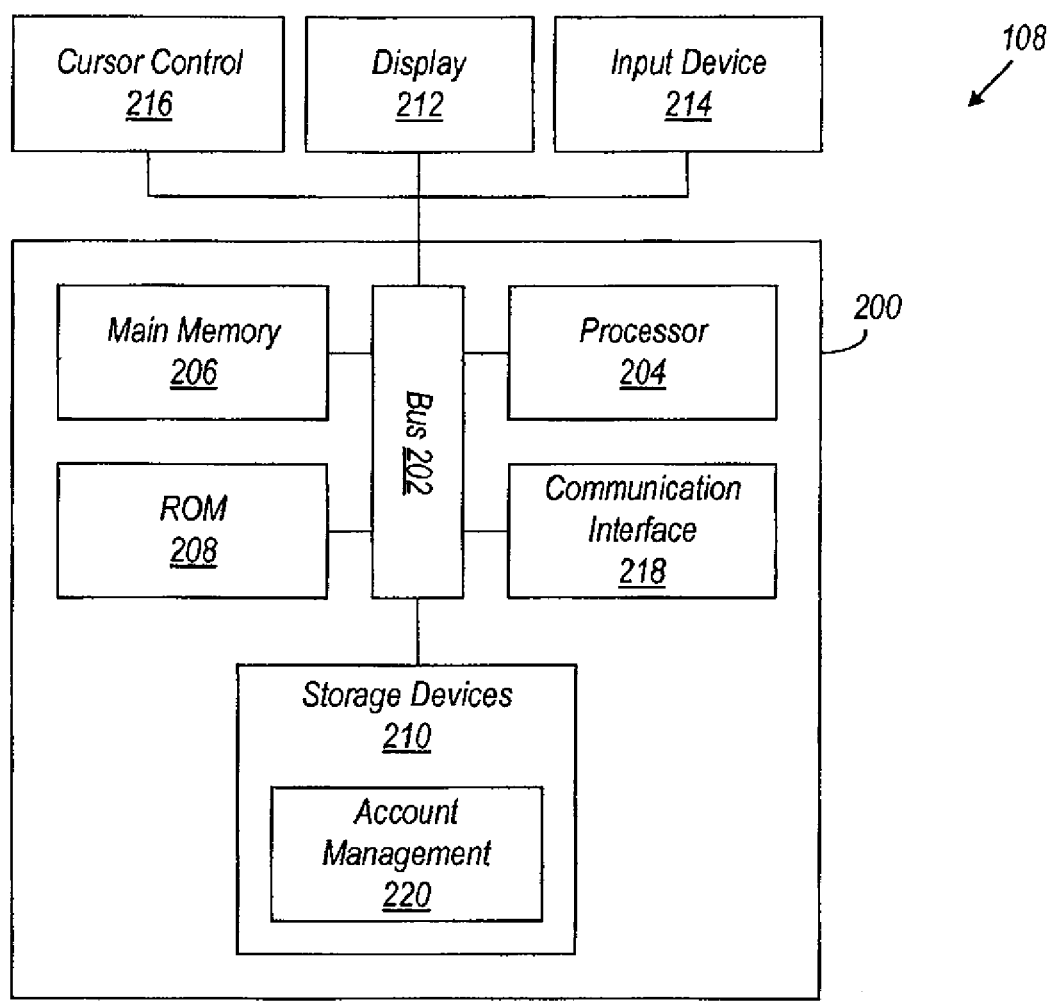
FIG. 2 illustrates an exemplary system for pre-filling account information according to the disclosed embodiments.

FIG. 2 illustrates the exemplary account management system 108 in more detail according to the disclosed embodiments. As can be seen, in one embodiment, the account management system 108 may include at least one server 200. Any suitable server 200 known to those having ordinary skill in the art may be used as part of the account management system 108, including a workstation, a Web server, a main frame, and the like. Such a server 200 typically includes a bus 202 or other communication mechanism for communicating information and a processor 204 coupled with the bus 202 for processing information. The server 200 may also include a main memory 206, such as a random access memory (RAM) or other dynamic storage device, coupled to the bus 202 for storing computer readable instructions to be executed by the processor 204. The main memory 206 may also be used for storing temporary variables or other intermediate information during execution of the instructions to be executed by the processor 204. The server 200 may further include a read only memory (ROM) 208 or other static storage device coupled to the bus 202 for storing static information and instructions for the processor 204. A computer readable storage device 210, such as a magnetic disk or optical disk, may be coupled to the bus 202 for storing information and instructions for the processor 204.

The server 200 may be coupled via the bus 202 to a display 212, such as a cathode ray tube (CRT), for displaying information to a user. An input device 214, including, for example, alphanumeric and other keys, may be coupled to the bus 202 for communicating information and command selections to the processor 204. Another type of user input device may be a cursor control 216, such as a mouse, a trackball, or cursor direction keys for communicating direction information and command selections to the processor 204, and for controlling cursor movement on the display 212. The cursor control 216 typically has two degrees of freedom in two axes, a first axis (e.g., X axis) and a second axis (e.g., Y axis), that allow the device to specify positions in a plane.

The term "computer readable instructions" as used above refers to any instructions that may be performed by the processor 204 and/or other components. Similarly, the term "computer readable medium" refers to any storage medium that may be used to store the computer readable instructions. Such a medium may take many forms, including, but not limited to, non volatile media, volatile media, and transmission media. Non volatile media may include, for example, optical or magnetic disks, such as the storage device 210. Volatile media may include dynamic memory, such as main memory 206. Transmission media may include coaxial cables, copper wire and fiber optics, including wires of the bus 202. Transmission media may also take the form of acoustic or light waves, such as those generated during radio frequency (RF) and infrared (IR) data communications. Common forms of computer readable media may include, for example, a floppy disk, a flexible disk, hard disk, magnetic tape, any other magnetic medium, a CD ROM, DVD, any other optical medium, punch cards, paper tape, any other physical medium with patterns of holes, a RAM, a PROM, an EPROM, a FLASH EPROM, any other memory chip or cartridge, a carrier wave, or any other medium from which a computer can read.

Various forms of the computer readable media may be involved in carrying one or more sequences of one or more instructions to the processor 204 for execution. For example, the instructions may initially be borne on a magnetic disk of a remote computer. The remote computer can load the instructions into its dynamic memory and send the instructions over a telephone line using a modem. A modem local to the account management system 108 can receive the data on the telephone line and use an infrared transmitter to convert the data to an infrared signal. An infrared detector coupled to the bus 202 can receive the data carried in the infrared signal and place the data on the bus 202. The bus 202 carries the data to the main memory 206, from which the processor 204 retrieves and executes the instructions. The instructions received by the main memory 206 may optionally be stored on the storage device 210 either before or after execution by the processor 204.

The server 200 may also include a communication interface 218 coupled to the bus 202. The communication interface 218 typically provides a two way data communication coupling between the server 200 and the network 106. For example, the communication interface 218 may be an integrated services digital network (ISDN) card or a modem used to provide a data communication connection to a corresponding type of telephone line. As another example, the communication interface 218 may be a local area network (LAN) card used to provide a data communication connection to a compatible LAN. Wireless links may also be implemented. Regardless of the specific implementation, the main function of the communication interface 218 is to send and receive electrical, electromagnetic, optical, or other signals that carry digital data streams representing various types of information.

In accordance with the disclosed embodiments, and account management module 220, or rather the computer-readable instructions therefor, may also reside on the storage device 210. The computer-readable instructions for the account management module 220 may then be executed by the processor 204 and/or other components of the server 200 to capture external account information from fund transfers that a customer electronically conducts through the account management system 108. The account management module 220 may thereafter use the external account information along with personal information for the customer (already stored) to pre-fill one or more account information fields as needed.

Following is a description of exemplary implementations of the account management module 220 according to the disclosed embodiments. In one implementation, referring to FIGS. 3A-3B, the management module 220 pre-fills one or more account information fields by providing a user interface 300 for the customer. The particular user interface 300 shown here is for the financial services industry, but those having ordinary skill in the art will recognize that similar user interfaces may be implemented for other industries without departing from the scope of the disclosed embodiments. In addition, although a particular design and layout for the user interface 300 are shown here, other designs and layouts may certainly be used without departing from the scope of the disclosed embodiments.

As can be seen, the user interface 300 includes a series of tabs 302 that provide the customer with a plurality of service categories. Some of these service categories may include, for example, banking, investment, insurance, financial planning, shopping, and the like. In the example of FIGS. 3A-3B, the customer has selected the banking category, which in turn offers the customer with several banking options. One of the services offered under the banking option is opening a new checking account, selection of which presents the customer with a checking account application. As is typically the case, the checking account application contains a series of personal information fields that the customer must fill out. These personal information fields may include, for example, a name field 304a, an address field 304b, a city-state-zip code field 304c, and a telephone number field 304d. Other personal information fields besides the particular personal information fields 304a-d here may of course be provided without departing from the scope of the disclosed embodiments.

Because the customer's personal information has been captured and stored in the account management system 108 by virtue of the customer having one or more accounts with the financial institution 102, the account management module 220 may use this presently-available information to automatically fill in the personal information fields 304a-d. Thus, in accordance with the disclosed embodiments, the account management module automatically pre-fills the personal information fields 304a-d for the customer. In some cases, multiple individuals (e.g., husband and wife) may share a joint account with the financial institution 102. In that case, the account management module 220 may request that the customer choose one or more names to be used for the name field 304a, for example, by selecting the name or names from a drop-down menu (see FIG. 3A). Thereafter, in accordance with the disclosed embodiments, the account management module 220 automatically fills in the remaining personal information fields 304b-d for the customer using previously captured and stored personal information for the name or names selected (see FIG. 3B). As can be seen, the address field 304b, city-state-zip code field 304c, and telephone number field 304d have all been automatically filled in, thereby making the application process much simpler for the customer. In some embodiments, however, it is possible for the customer to manually override any of the information automatically filled in by the account management module 220.

Figure 4A:
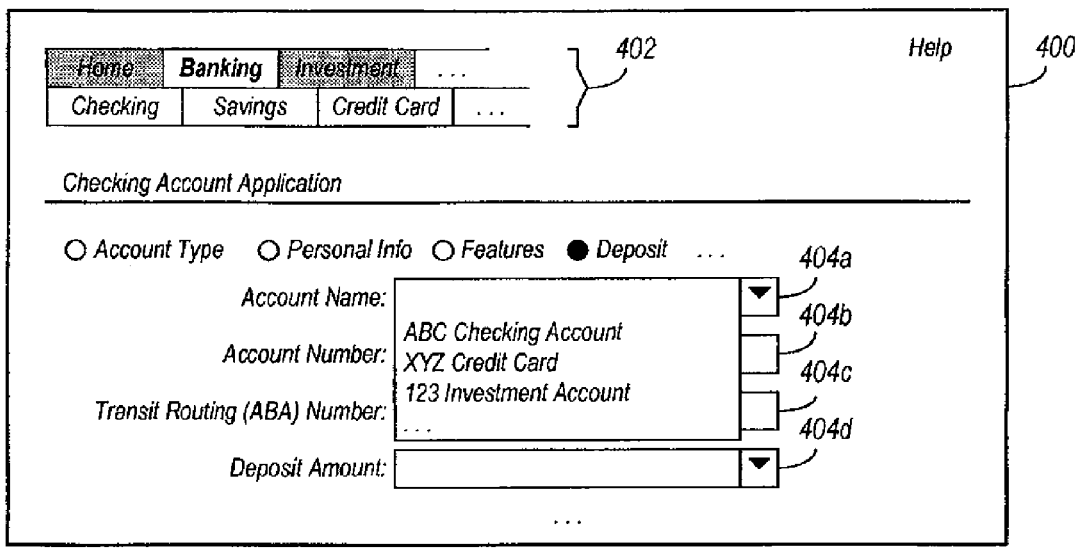
FIGS. 4A-4B illustrate another exemplary interface for pre-filling external account information according to the disclosed embodiments.
Figure 4B:
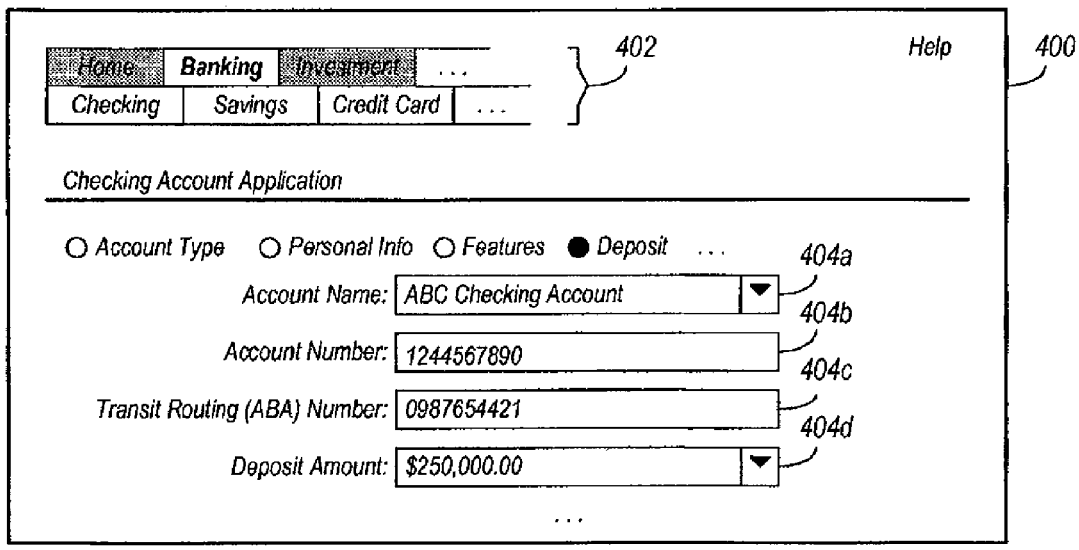

The management module 220 may additionally (or alternatively) pre-fill one or more external account information fields for the customer in some embodiments. This is convenient, for example, where the customer wishes to make a deposit in the new checking account using some or all of the funds from an external financial (e.g., checking, savings, investment, etc.) account. Referring now to FIGS. 4A-4B, in one embodiment, the management module 220 may automatically pre-fill one or more external account information fields by providing another user interface 400 for the customer. Similar to the user interface 300 of FIGS. 3A-3B, the user interface 400 shown here is for the financial services industry, but is not limited thereto, nor is it limited by the particular design or layout shown.

Like the user interface 300, the user interface 400 also includes a series of tabs 402 that provide the customer with a plurality of service categories, including, banking, investment, insurance, financial planning, shopping, and the like. In the example of FIGS. 4A-4B, however, the account management module 220 presents the customer with a plurality of external account information fields that the customer must fill out in order to transfer funds from an external account into the new checking account. These external account information fields may include, for example, an account name field 404a, an account number 404b, a transit routing number 404c, and a deposit amount field 404d. Other external account information fields besides the particular fields 404a-d here may of course be provided without departing from the scope of the disclosed embodiments.

As external account information has been captured and stored in the account management system 108 for one or more of the customer's external accounts by virtue of the customer having conducted one or more electronic funds transfers with the financial institution 102, the account management module 220 may use this existing information to automatically fill in the external account information fields 404a-d. In one embodiment, the account management module automatically pre-fills the external account information fields 404a-d by first asking the customer to choose one of the external accounts (where information for more than one external accounts has been captured and stored), for example, from a drop-down menu (see FIG. 4A). Thereafter, in accordance with the disclosed embodiments, the account management module 220 automatically fills in one or more of the remaining external account information fields 404b-d for the chosen external account using previously captured and stored external account information for the selected external account (see FIG. 4B). As can be seen, the account number 404b and the transit routing number 404c have been automatically filled in, thereby making the application process more convenient for the customer. In some embodiments, however, it is possible for the customer to manually override any of the information automatically filled in by the account management module 220. Thereafter, the customer may indicate an amount to be transferred by typing the amount in the deposit amount field 404d or by selecting one of several amount options (including a "transfer all funds" option) from a drop-down menu.

Figure 5:
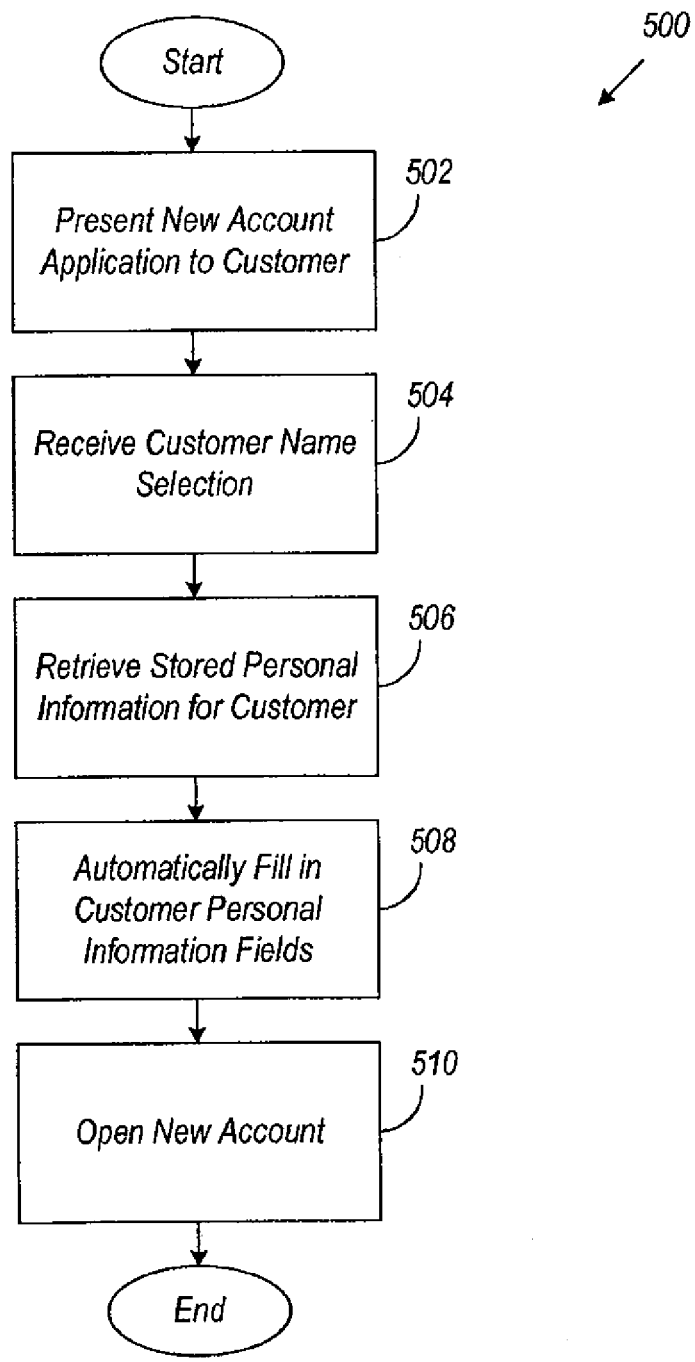
FIG. 5 illustrates an exemplary method for pre-filling personal information according to the disclosed embodiments.
Figure 6:
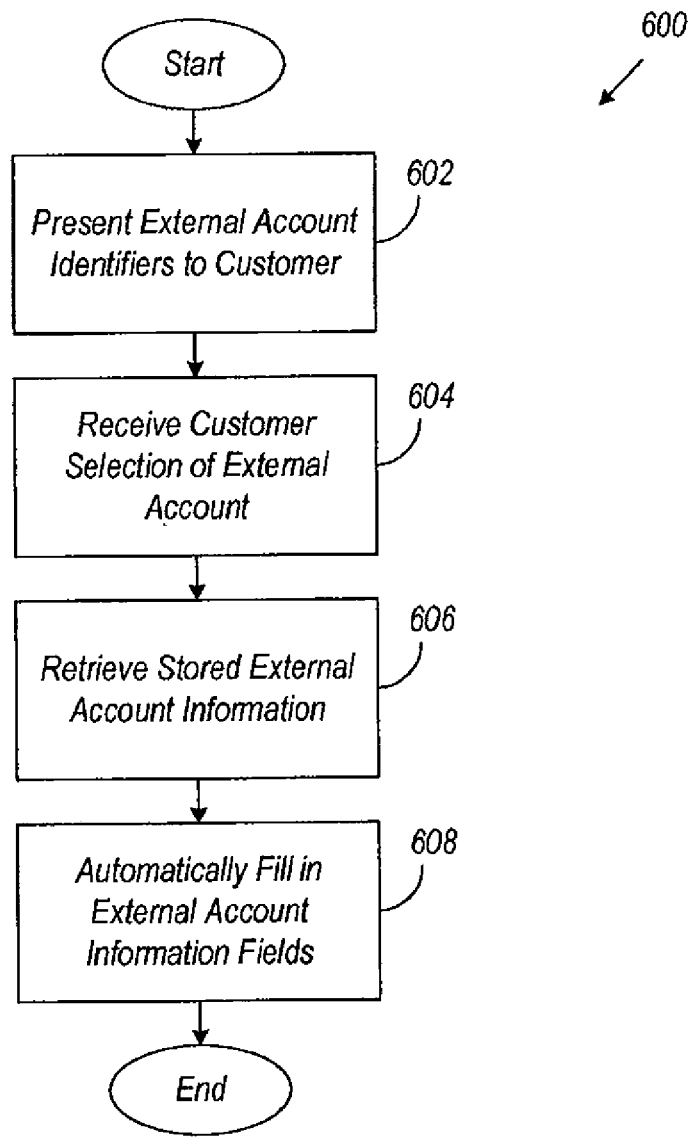
FIG. 6 illustrates another exemplary method for pre-filling external account information according to the disclosed embodiments.

Thus far, the disclosed embodiments have been described with respect to a number of software and hardware components. Following are general methodologies that may be implemented in connection with the disclosed embodiments, as described with respect to FIGS. 5-6. It should be noted that although several discrete steps are shown in FIGS. 5-6, those having ordinary skill in the art will understand that one or more of these steps may be combined into a single step and that any individual step may be divided into several constituent steps as needed without departing from the scope of the disclosed embodiments. Moreover, although the steps in FIGS. 5-6 are arranged in a particular sequence, those having ordinary skill in the art will recognize that one or more of the steps may be performed outside the sequence shown without departing from the scope of the disclosed embodiments.

Referring first to FIG. 5, a method 500 is shown illustrating use of acquired (and stored) personal information to pre-fill an account application according to the disclosed embodiments. The method 500 begins at step 502 where the customer is presented with a new account application containing a series of personal information fields. At step 504, the customer is requested to enter the name of the person to be used for the account (where more than one name is available). Previously stored personal information for the person named on the account is thereafter retrieves at step 506 and used to automatically fill in the personal information fields of the account application at step 508. At step 510, the new account is opened.

FIG. 6 illustrates a method 600 for using acquired (and stored) external account information to pre-fill an account application according to the disclosed embodiments. The method 600 begins at step 602 where one or more external account identifiers are presented to the customer for selection.

The one or more external account identifiers may be identifiers for external accounts used to make loan payments to the loan system, fund accounts of the brokerage account system, replenish accounts administered via the deposit servicing system, or make insurance premium payments on policies administered via the insurance system.

Once the customer makes a selection at step 604, external account information corresponding to the selected external account is retrieved at step 606. In a financial institution, the deposit servicing system or another system interoperably connected to the account management system requests external account information relative to one or more accounts used by a customer. The request made at step 606 is often made responsive to a request by the customer of the financial institution via the deposit servicing system to set up a new account with the financial institution or switch an account from an external financial institution to the customer's financial institution. Those having skill in the art will appreciate that, in the event that an account is to be switched from the external financial institution to the customer's financial institution, it is not necessary that the account being switched be funded from the account at the external financial institution being switched to the financial institution. Rather, any external account for which information has been stored by the account management system can be used to fund the new account. In addition, external account information stored by the account management system can be used for other purposes besides funding a new or switched account at the customer's financial institution without departing from principles of the disclosed embodiments.

At step 608, the external account information retrieved at step 606 is used to automatically fill in the external account information fields of the account application. A transaction may thereafter be conducted using the external account information as needed. For example, in a financial institution, an initial deposit may be made into the account via electronic funds transfer using the external account information.

While the disclosed embodiments have been described with reference to one or more particular implementations, those skilled in the art will recognize that many changes may be made thereto. Therefore, each of the foregoing embodiments and obvious variations thereof is contemplated as falling within the spirit and scope of the disclosed embodiments, which are set forth in the following claims.

What is claimed is:

1. A method comprising:
    capturing account-identifying information for one or more external accounts of a customer belonging to a first institution from at least one of an inbound and an outbound electronic financial transaction between the first institution of the customer and the one or more external accounts that are from a third party institution;
    requesting the customer to choose one of the one or more external accounts from which to create a new account at the first institution; and
    presenting one or more external account information fields for the new account at the first institution using the captured account-identifying information for the one of the one or more external accounts chosen by the customer.

2. The method of claim 1, wherein the at least one of the inbound and outbound electronic financial transaction involves a payment to the first institution from the third party institution made by the customer for services provided to the customer by the first institution.

3. The method of claim 2, wherein services provided to the customer by the first institution include at least one of a financial account and an insurance account.

4. The method of claim 1, further comprising storing the captured account-identifying information for external accounts of the customer.

5. The method of claim 4, wherein the captured account-identifying information for external accounts of the customer is stored at the first institution of the customer.

6. The method of claim 1, wherein the method includes pre-filling the one or more external account information fields with the captured account-identifying information for the external accounts.

7. The method of claim 1, further comprising presenting one or more external account identifiers to the customer for selection of the external account.

8. The method of claim 7, further comprising:
    selecting the external account identifier; and
    retrieving the external account information upon selection of the external account identifier.

9. The method of claim 7, further comprising conducting a transaction with the new account at the first institution using the captured account-identifying information for the one of the one or more external accounts.

10. A non-transitory computer-readable medium having computer-executable instructions stored thereon that are executed by a processor to:
    capture account-identifying information for external accounts of a customer belonging to a first institution from at least one of an inbound and an outbound electronic financial transaction between the first institution of the customer and the external accounts that are from a third party institution;
    present an external account identifier to the customer for selection of the external account;
    request the customer to choose one of the external accounts from which to create a new account at the first institution; and
    present an external account information field for the new account at the first institution using the captured account-identifying information for the external account chosen by the customer.

11. The non-transitory computer-readable medium of claim 10, wherein the captured account-identifying information is personal information.

12. The non-transitory computer-readable medium of claim 10, wherein the electronic financial transaction is at least one of a loan payment, an insurance-premium payment, a deposit into a checking or savings account; a withdrawal from a checking or savings account; a deposit into a brokerage account, and a withdrawal from a brokerage account.

13. The non-transitory computer-readable medium of claim 10, wherein the first institution and the third party institution are different institutions in a same industry.

14. The non-transitory computer-readable medium of claim 10, wherein the electronic financial transaction is an electronic funds transfer.

15. A system, comprising:
    a processor;
    a memory storing computer-readable instructions, the computer-readable instructions executable by the processor to:
    capture account-identifying information for one or more external accounts of a customer belonging to a first institution from at least one of an inbound and an outbound electronic financial transaction between the first institution of the customer and the one or more external accounts that are from a third party institution;

request the customer to choose one of the one or more external accounts from which to create a new account at the first institution;

present one or more external account information fields for the new account at the first institution using the captured account-identifying information for the one of the one or more external accounts chosen by the customer; and conduct an electronic financial transaction with the new account at the first institution using the captured account-identifying information for the one of the one or more external accounts.

16. The system of claim 15, wherein the electronic financial transaction conducted with the new account involves an electronic funds transfer.

17. The system of claim 15, wherein the computer-readable instructions are executable by the processor to pre-fill the one or more external account information fields with the captured account-identifying information for the external accounts.

18. The system of claim 17, wherein the computer-readable instructions are executed to pre-fill the one or more external account information fields with personal information that is included in the captured account-identifying information for the external accounts.

19. The system of claim 15, wherein the electronic financial transaction conducted with the new account includes at least one of a loan payment, an insurance-premium payment, a deposit into a checking or savings account; a withdrawal from a checking or savings account; a deposit into a brokerage account, and a withdrawal from a brokerage account.

20. The system of claim 15, wherein the first institution and the independent third party institution are different institutions in a different industry.

* * * * *